United States Patent
Namiki et al.

(10) Patent No.: US 10,461,515 B2
(45) Date of Patent: Oct. 29, 2019

(54) PROTECTOR AND WIRING STRUCTURE (71) Applicant: Yazaki Corporation, Tokyo (JP)

(72) Inventors: Shintaro Namiki, Shizuoka (JP); Satoshi Uematsu, Shizuoka (JP)

(73) Assignee: YAZAKI CORPORATION, Tokyo (JP)

(*) Notice: Subject to any disclaimer, the term of this patent is extended or adjusted under 35 U.S.C. 154(b) by 0 days.

(21) Appl. No.: 16/163,249

(22) Filed: Oct. 17, 2018

(65) Prior Publication Data
US 2019/0140431 A1 May 9, 2019

(30) Foreign Application Priority Data
Nov. 9, 2017 (JP) ................... 2017-216283

(51) Int. Cl.
H02G 3/04 (2006.01)
B60R 16/02 (2006.01)
H01B 17/58 (2006.01)

(52) U.S. Cl.
CPC ....... H02G 3/0418 (2013.01); B60R 16/0215 (2013.01); H01B 17/58 (2013.01)

(58) Field of Classification Search
CPC ........ B60R 16/0215; H02G 3/30; H02G 3/32; H02G 3/04; H02G 3/0406; H02G 3/0412; H02G 3/0418; H02G 3/0425; H02G 3/0431; H02G 3/0437; H02G 3/0462; H02G 3/36; F16L 3/105; H01B 7/0045; H01B 7/18; H01B 7/1805; H01B 7/181; H01B 7/1815; H01B 7/182
See application file for complete search history.

(56) References Cited

U.S. PATENT DOCUMENTS

2005/0108858 A1* 5/2005 Daito ............... H02G 3/32
24/16 PB

FOREIGN PATENT DOCUMENTS

| JP | 7-95714 A | 4/1995 |
| JP | 2000-152469 A | 5/2000 |
| JP | 2007-174821 A | 7/2007 |
| JP | 2009-65798 A | 3/2009 |
| JP | 2009-131055 A | 6/2009 |
| JP | 2011-250522 A | 12/2011 |
| JP | 5939400 B2 | 6/2016 |
| JP | 2017-127122 A | 7/2017 |
| JP | 2017-163654 A | 9/2017 |

* cited by examiner

Primary Examiner — Roshn K Varghese
(74) Attorney, Agent, or Firm — Kenealy Vaidya LLP (57) ABSTRACT A protector includes a main body having a support surface that supports a wiring material and a back surface and having a first wall and a second wall erected with respect to the first wall from a first edge, wherein the main body has an insertion hole into which a band portion of a band member is inserted and a locking portion which locks a head portion, the band member having the band portion and the head portion, the locking portion corresponds to a pair of protrusions, each of the pair of protrusions has a width direction wall and a locking wall, the locking wall is formed at a second edge, distal ends of locking walls face each other, and an interval between the distal ends of the locking walls is an interval that allows passage of the band portion and regulates passage of the head portion.

10 Claims, 11 Drawing Sheets

PROTECTOR AND WIRING STRUCTURE

CROSS-REFERENCE TO RELATED APPLICATION(S)

The present application claims priority to and incorporates by reference the entire contents of Japanese Patent Application No. 2017-216283 filed in Japan on Nov. 9, 2017.

BACKGROUND OF THE INVENTION

1. Field of the Invention

The present invention relates to a protector and a wiring structure.

2. Description of the Related Art

In a wire harness mounted in a vehicle, etc., there is a case in which a wiring material included in the wire harness is fixed to a protector. The wiring material is protected from an external force, etc. by the protector. The wiring material is fixed to the protector by a binding band. A band portion of the binding band is wound around the wiring material and the protector. Further, the band portion is fixed while being wound around the protector and the wiring material by a head portion of the binding band. In this instance, the head portion of the binding band may move from a predetermined position and interfere with another article.

For example, Japanese Patent Publication No. 5939400 discloses a technology of a binding band fixing structure in which an upper end surface of a binding band holding portion is located below an upper end surface of a wall of a support member. In the binding band fixing structure of Japanese Patent Publication No. 5939400, between the upper end surface of the binding band holding portion and an external surface of the wall, a head accommodation portion formed by the surfaces is provided. According to Japanese Patent Publication No. 5939400, it is possible to dramatically improve positioning stability in the support member of the binding band by accommodating and holding the head portion of the binding band in the head accommodation portion.

Relevant patent literatures are listed below.
Japanese Patent Application Laid-open No. 7-95714
Japanese Patent Application Laid-open No. 2000-152469
Japanese Patent Application Laid-open No. 2007-174821
Japanese Patent Application Laid-open No. 2009-65798
Japanese Patent Application Laid-open No. 2009-131055
Japanese Patent Application Laid-open No. 2011-250522
Japanese Patent Application Laid-open No. 2017-127122
Japanese Patent Application Laid-open No. 2017-163654

However, the binding band fixing structure described in Japanese Patent Publication No. 5939400 described above has room for improvement in terms of workability.

SUMMARY OF THE INVENTION

A purposes of the present invention is to provide a protector and a wiring structure that facilitates fixing of the wiring structure to the protector by a band member, and that suppresses a misalignment of a head portion after fixing.

According to an aspect of the present invention, a protector includes a main body having a support surface that supports a wiring material and a back surface on an opposite side from the support surface and having a first wall and a second wall erected with respect to the first wall from a first edge that is one edge of the first wall in a width direction. The main body has an insertion hole into which a band portion of a band member is inserted and a locking portion that locks a head portion, the band member having the band portion and the head portion into which the band portion is inserted, the locking portion includes a pair of protrusions protruding from the back surface, each of the pair of protrusions has a width direction wall extending in a direction intersecting an extending direction of the first wall and a locking wall protruding from the width direction wall toward the other one of the pair of protrusions, the locking wall is formed at a second edge that is the other edge of the first wall in the width direction, and distal ends of locking walls face each other, and an interval between the distal ends of the locking walls may be an interval that allows passage of the band portion and regulates passage of the head portion.

According to another aspect of the present invention, in the protector, a groove that allows passage of the band portion and guides the band portion to between the distal ends of the locking walls is formed on an end surface of the first wall on a side of the second edge.

According to still another aspect of the present invention, in the protector, the width direction wall may extend from the locking wall to the insertion hole.

According to still another aspect of the present invention, a wiring structure includes a wiring material, a protector having a support surface that supports the wiring material and a back surface on an opposite side from the support surface, the wiring material being wired along the support surface, and a band member having a band portion and a head portion into which the band portion is inserted and fixing the wiring material to the protector. The protector has a first wall and a second wall erected with respect to the first wall from a first edge that is one edge of the first wall in a width direction, the protector has an insertion hole into which the band portion is inserted and a locking portion that locks the head portion, the locking portion includes a pair of protrusions protruding from the back surface, each of the pair of protrusions has a width direction wall extending in a direction intersecting an extending direction of the first wall and a locking wall protruding from the width direction wall toward the other one of the pair of protrusions, the locking wall is formed at a second edge that is the other edge of the first wall in the width direction, and distal ends of locking walls face each other, an interval between the distal ends of the locking walls is an interval that allows passage of the band portion and regulates passage of the head portion, and the band portion is inserted into the insertion hole, is wound around the wiring material and the protector, passes between the distal ends of the locking wall, and is inserted into the head portion.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Hereinafter, a protector according to an embodiment of the invention will be described in detail with reference to drawings. It should be noted that the invention is not limited by this embodiment. In addition, a constituent element in the embodiment below includes a constituent element that can be easily assumed by those skilled in the art or substantially the same one.

Embodiment

Figure 1:
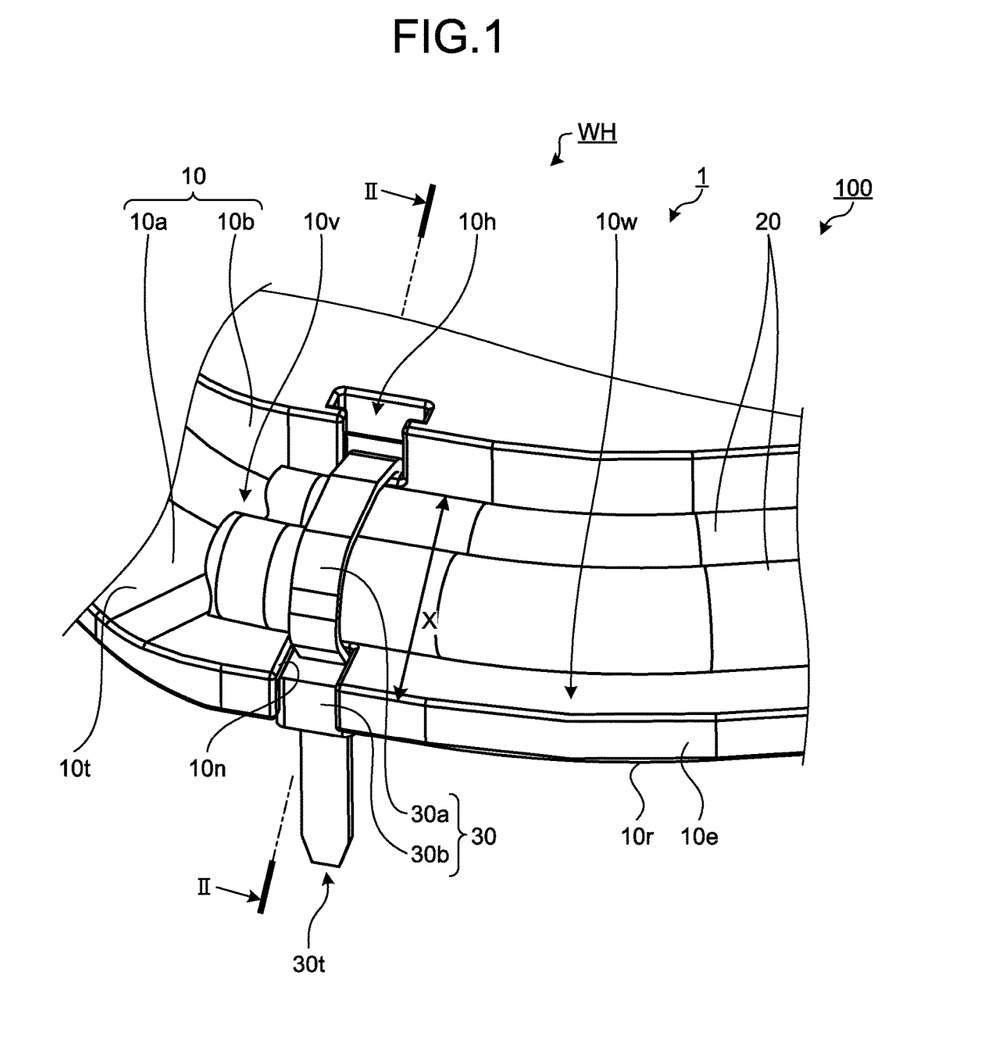
FIG. 1 is a perspective view illustrating a protector according to an embodiment.
Figure 2:
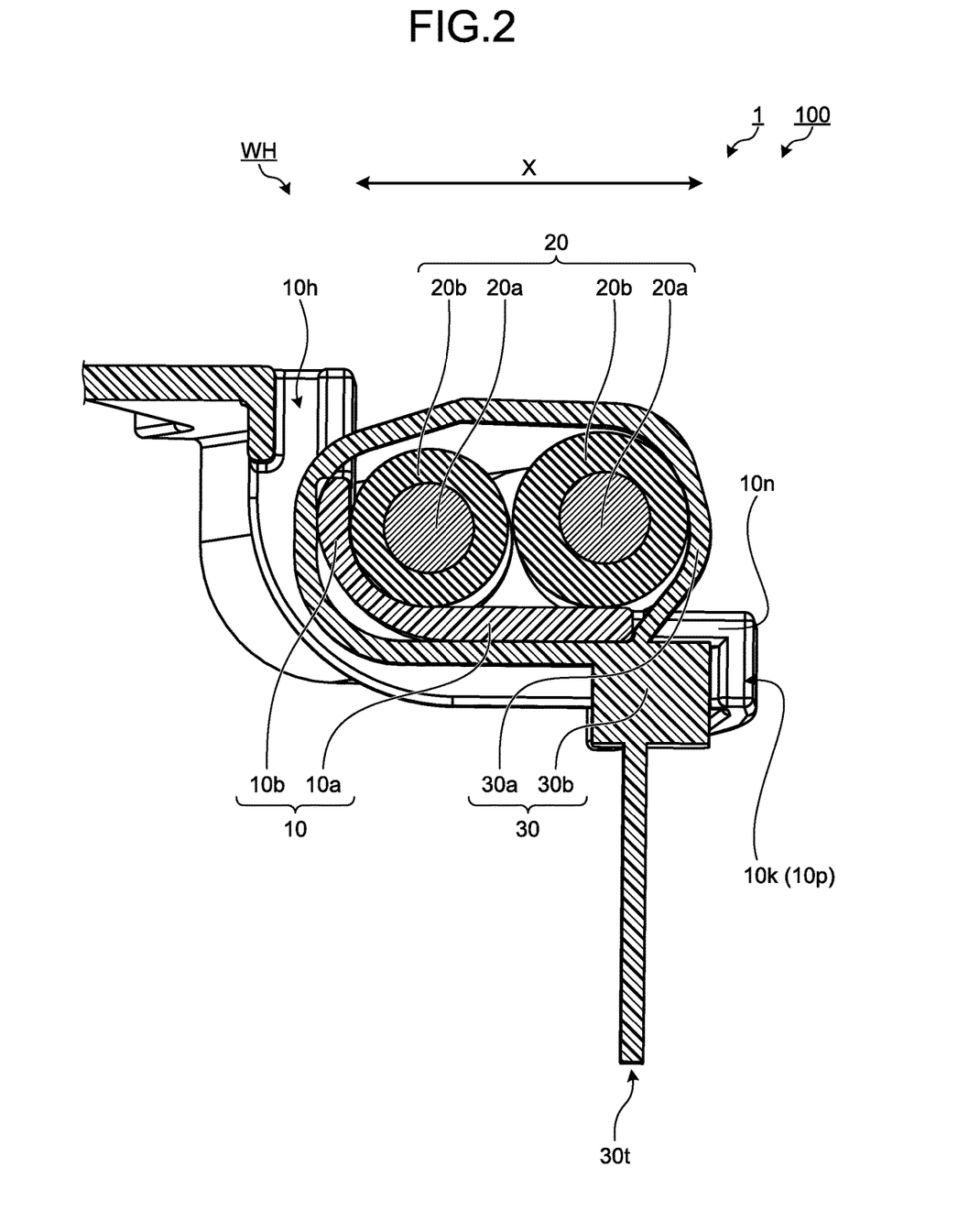
FIG. 2 is a cross-section view taken along II-II line illustrated in FIG. 1.
Figure 3:
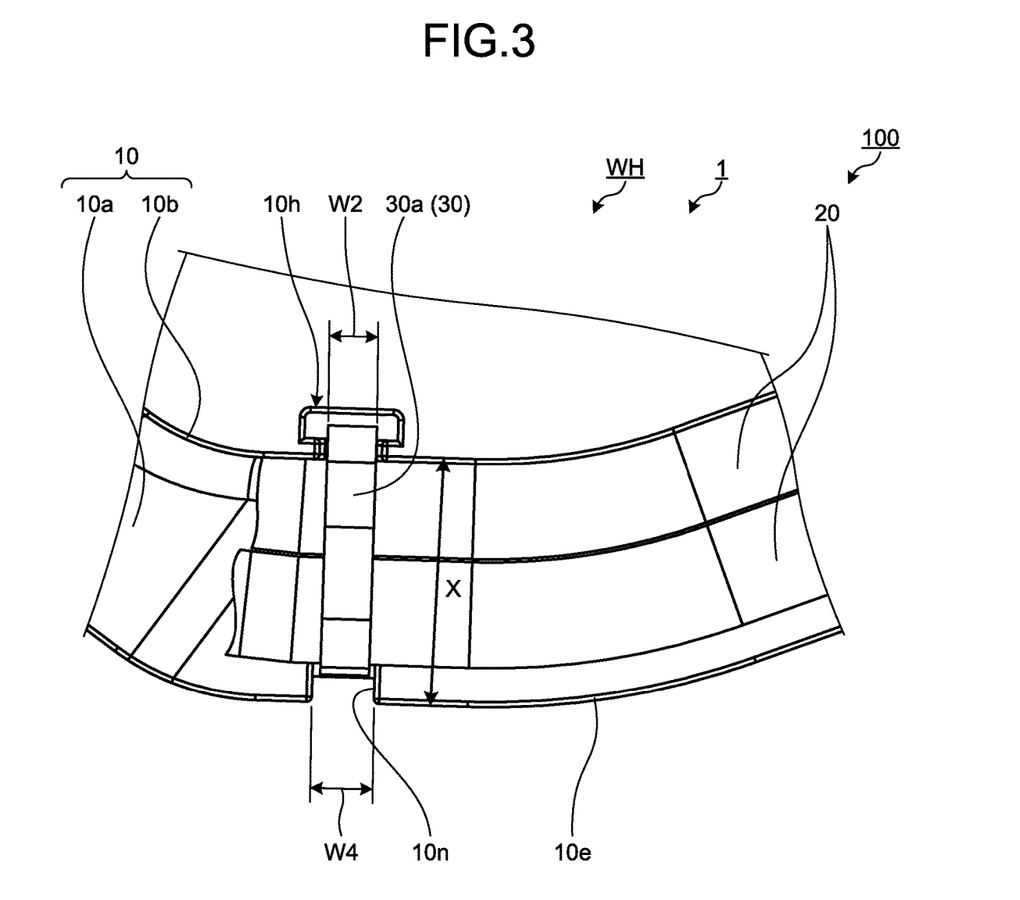
FIG. 3 is a plan view illustrating the protector according to the embodiment.
Figure 4:
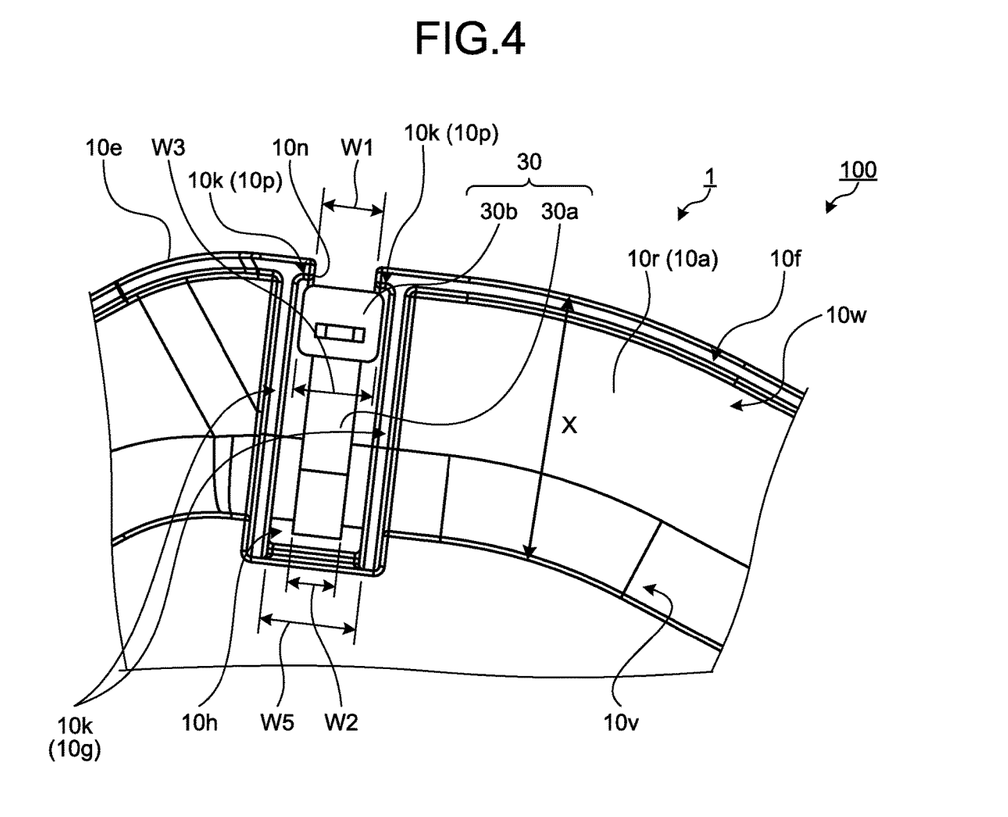
FIG. 4 is a plan view illustrating the protector according to the embodiment.
Figure 5:
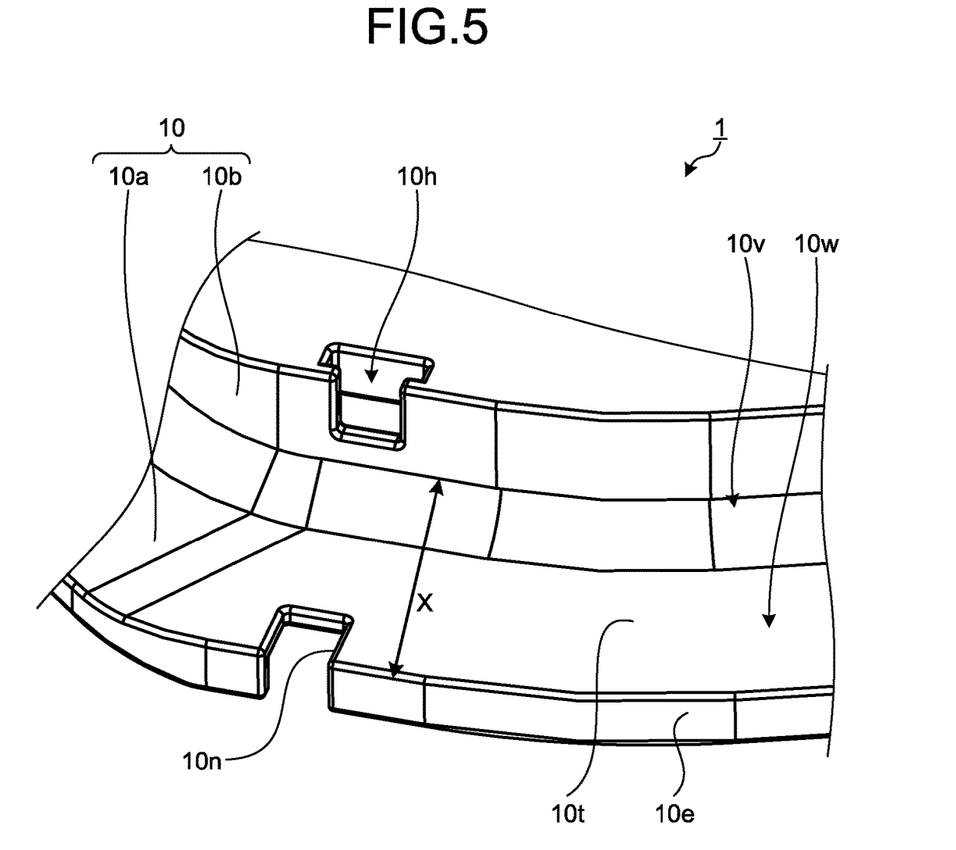
FIG. 5 is a perspective view illustrating the protector according to the embodiment.
Figure 6:
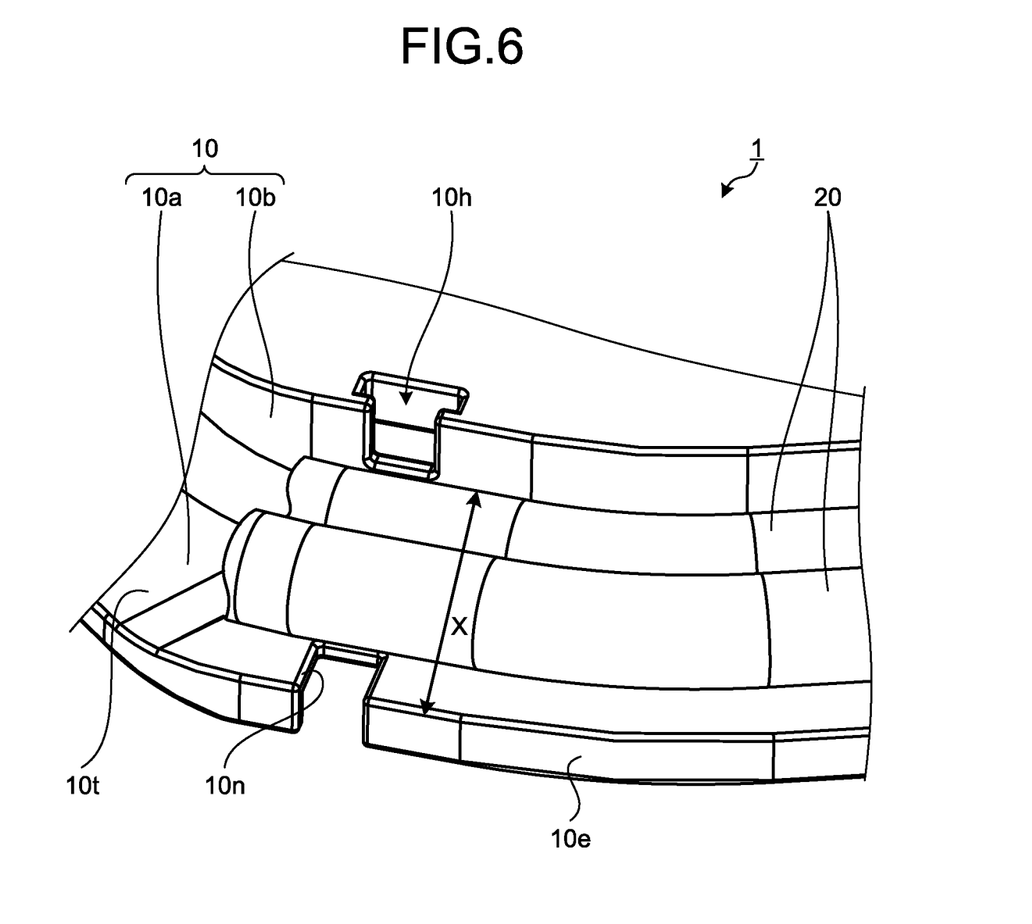
FIG. 6 is a perspective view illustrating a main body of the protector according to the embodiment.
Figure 7:
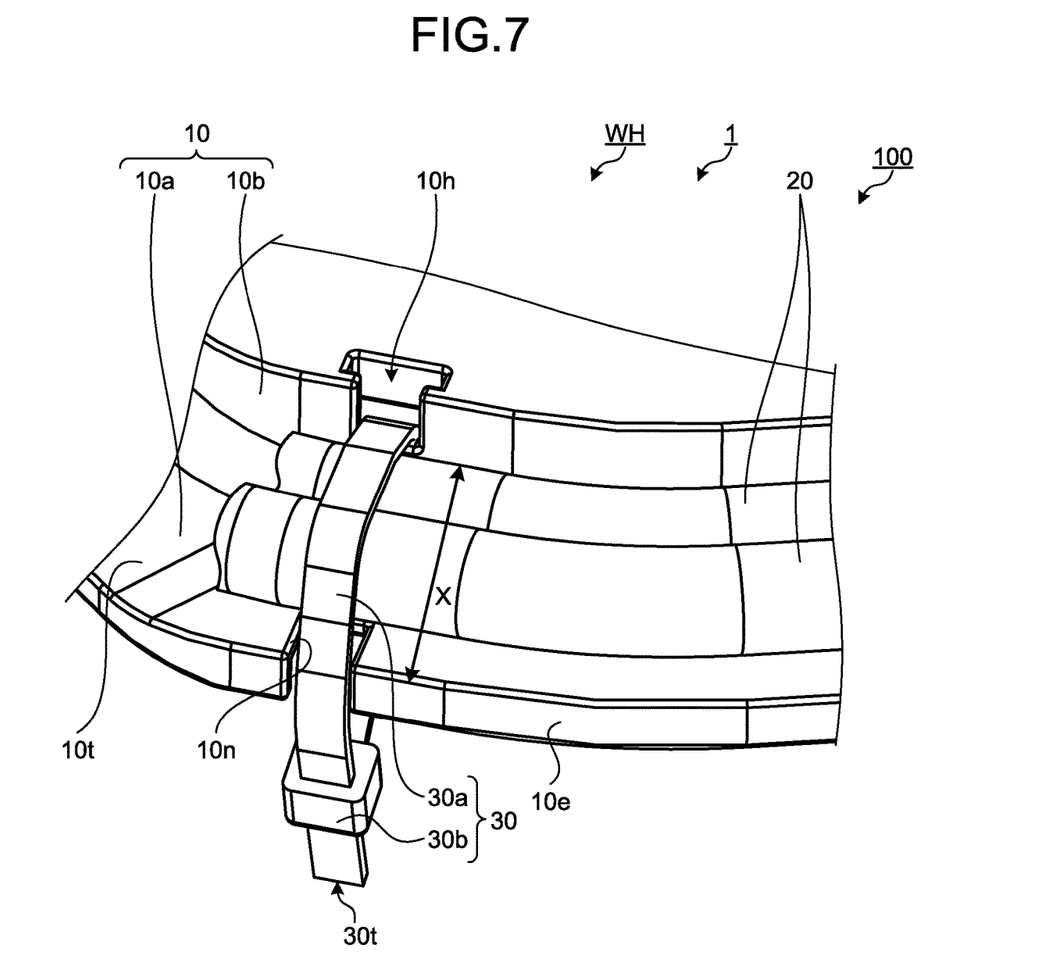
FIG. 7 is a perspective view illustrating the protector according to the embodiment.
Figure 8:
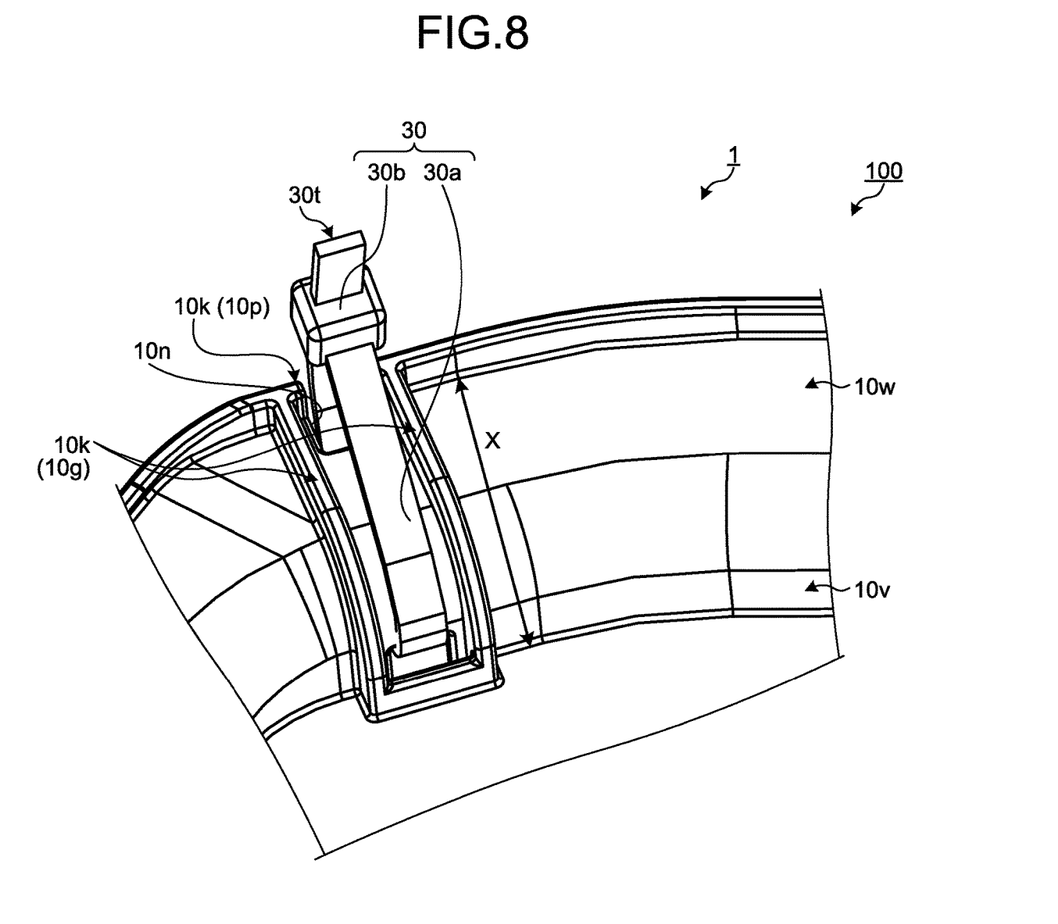
FIG. 8 is a perspective view illustrating the protector according to the embodiment.

The embodiment will be described with reference to FIG. 1 to FIG. 8. The embodiment relates to a protector and a wiring structure. FIG. 1 is a perspective view illustrating a protector according to an embodiment. FIG. 2 is a cross-section view taken along II-II line illustrated in FIG. 1. FIG. 3 is a plan view illustrating the protector according to the embodiment. FIG. 4 is a plan view illustrating the protector according to the embodiment. FIG. 5 is a perspective view illustrating the protector according to the embodiment. FIG. 6 is a perspective view illustrating a main body of the protector according to the embodiment. FIG. 7 is a perspective view illustrating the protector according to the embodiment. FIG. 8 is a perspective view illustrating the protector according to the embodiment.

FIG. 3 is a plan view of the protector according to the embodiment when viewed from a support surface side. FIG. 4 is a plan view of the protector according to the embodiment when viewed from a back surface side. FIG. 6 is a perspective view of a state in which a wiring material is placed on the main body of the protector according to the embodiment when viewed from the support surface side. FIG. 7 is a perspective view of a state before the band member is fixed in the protector according to the embodiment when viewed from the support surface side. FIG. 8 is a perspective view of the state before the band member is fixed in the protector according to the embodiment when viewed from the back surface side.

A protector 1 according to the embodiment is incorporated in a wire harness WH and mounted in a vehicle such as an automobile. The protector 1 protects a wiring material 20 included in the wire harness WH from an external force, etc. In the protector 1 according to the embodiment, the wiring material 20 is fixed by a wiring structure 100 according to the embodiment.

As illustrated in FIG. 1, the protector 1 according to the embodiment includes a main body 10. The main body 10 has a support surface 10t and a back surface 10r on an opposite side from the support surface 10t. The support surface 10t is a surface that supports the wiring material 20 fixed to the protector 1. The main body 10 is an insulating resin member.

The main body 10 has a first wall 10a and a second wall 10b. The first wall 10a has a first edge 10v which is one edge of the first wall 10a in a width direction X and a second edge 10w which is the other edge of the first wall 10a in the width direction X. That is, the first wall 10a has the first edge 10v and the second edge 10w on the opposite side from the first edge 10v in the width direction X.

The second wall 10b is erected from the first edge 10v with respect to the first wall 10a. In the embodiment, the first wall 10a extends in a slightly curved manner in a direction orthogonal to two directions corresponding to a direction from the back surface 10r of the first wall 10a to the support surface 10t of the first wall 10a and the width direction X. The second wall 10b extends along an extending direction of the first wall 10a. In the embodiment, the first edge 10v is a curved portion curved to stand upright in a direction from the back surface 10r of the second edge 10w toward the support surface 10t side of the second edge 10w. The first edge 10v may not be curved to stand upright in the direction from the back surface 10r of the second edge 10w toward the support surface 10t side of the second edge 10w. That is, the first wall 10a may be a substantially flat wall. In addition, the second wall 10b may stand substantially vertically or slightly inclined with respect to the first wall 10a.

The wiring material 20 is placed on the support surface 10t and wired between the first edge 10v and the second edge 10w along the first wall 10a. The wiring material 20 is an electric wire. As illustrated in FIG. 2, the wiring material 20 is obtained by covering an outside of a core wire 20a (metal element wire) with an insulating coating portion 20b. In the embodiment, two electric wires as the wiring material 20 are supported on the support surface 10t.

As illustrated in FIG. 1 and FIG. 2, the main body 10 and the wiring material 20 are fixed by a band member 30. The band member 30 has a band portion 30a and a head portion 30b. The band portion 30a extends from the head portion 30b. That is, the head portion 30b is located on one end side of the band portion 30a. The head portion 30b locks and fixes the band portion 30a by insertion of a distal end 30t on the other end side of the band portion 30a. The band member 30 in the embodiment is a so-called binding band. The band member 30 fixes the main body 10 and the wiring material 20 when the band portion 30a wound around the main body 10 and the wiring material 20 is locked in and fixed to the head portion 30b.

As illustrated in FIG. 1 to FIG. 3, the main body 10 has an insertion hole 10h into which the band portion 30a is inserted. In the embodiment, the insertion hole 10h is formed in the second wall 10b. The insertion hole 10h penetrates the second wall 10b from the support surface 10t to the back surface 10r. The insertion hole 10h is set to a size that allows passage of the band portion 30a and regulates passage of the head portion 30b.

As illustrated in FIG. 4, the main body 10 has a locking portion 10k that locks the head portion 30b. The head portion 30b is disposed on the back surface 10r side of the main body 10. The locking portion 10k corresponds to a pair of protrusions protruding from the back surface 10r. Each of the pair of protrusions corresponding to the locking portion 10k has a width direction wall 10g and a locking wall 10p. The width direction wall 10g extends in a direction interesting the extending direction of the first wall 10a. The locking wall 10p protrudes from the width direction wall 10g toward the other one of the pair of protrusions. Distal ends of locking walls 10p face each other. The locking wall 10p is formed at the second edge 10w. In the embodiment, a space between a pair of distal ends of the locking walls 10p and the insertion hole 10h are arranged at a predetermined interval in the width direction X. For example, the predetermined interval is set according to a thickness, the number, etc. of wiring materials fixed to the protector. The width direction wall 10g extends from the locking wall 10p to the insertion hole 10h on the back surface 10r of the main body 10. In the embodiment, the width direction wall 10g linearly extends along the width direction X. For example, the width direction wall 10g functions as a rib for improving strength of the main body 10.

An interval W1 between the distal ends of the locking walls 10p is an interval that allows passage of the band portion 30a and regulates passage of the head portion 30b. Specifically, the interval W1 between the distal ends of the locking walls 10p is wider than a width W2 of the band portion 30a and narrower than a width W3 of the head portion 30b. Here, the width W2 of the band portion 30a refers to a width of the band portion 30a in a direction orthogonal to a direction from the head portion 30b to the distal end 30t in the linearly extending band member 30. For example, the width W2 of the band portion 30a refers to a width of the band portion 30a in a direction (band width direction) orthogonal to two directions corresponding to the direction from the head portion 30b to the distal end 30t and a direction from a front surface to a back surface of the band portion 30a in the linearly extending band member 30. In addition, the width W3 of the head portion 30b refers to a width of the head portion 30b in the direction orthogonal to the direction from the head portion 30b to the distal end 30t in the linearly extending band member 30. For example, the width W3 of the head portion 30b refers to a width of the head portion 30b in the band width direction in the linearly extending band member 30. According to such a configuration, the locking wall 10p locks the head portion 30b in a direction from the first edge 10v to the second edge 10w.

An interval W5 of the width direction wall 10g is wider than the width W3 of the head portion 30b. A part of the band portion 30a and the head portion 30b are disposed between a pair of width direction walls 10g. The width direction wall 10g regulates a shift of the band member 30 in a direction in which the first wall 10a extends.

A groove 10n is formed on an end surface 10e on the second edge 10w side of the first wall 10a. In the embodiment, the groove 10n is formed in a shape obtained by cutting out the first wall 10a between the pair of distal ends of the locking walls 10p. The groove 10n allows passage of the band portion 30a and guides the band portion 30a to between the pair of distal ends of the locking walls 10p. A width W4 (see FIG. 3) of the groove 10n in a direction connecting the distal ends of the locking walls 10p is wider than the width W2 of the band portion 30a.

In the embodiment, the main body 10 has a rib 10f protruding from the back surface 10r. The rib 10f is linearly formed along a peripheral edge of the second edge 10w at which the groove 10n is not formed. The rib 10f is connected to the width direction wall 10g. The locking wall 10p is formed on an extension line of the rib 10f in the extending direction, and the locking wall 10p, the width direction wall 10g, and the rib 10f are connected to each other.

A description will be given of an operation of fixing the wiring material 20 to the main body 10 of the protector 1 with reference to FIG. 5 to FIG. 8.

As illustrated in FIG. 5, first, the main body 10 of the protector 1 is prepared. For example, the main body 10 is placed on a working stand such as a jig (not illustrated). As illustrated in FIG. 6, the wiring material 20 is placed on the support surface 10t of the first wall 10a. The wiring material 20 is placed along the extending direction of the first wall 10a. As illustrated in FIG. 7 and FIG. 8, the band portion 30a is inserted into the insertion hole 10h from the back surface 10r side of the main body 10 and wound around the main body 10 and the wiring material 20. The band portion 30a passes between the distal ends of the locking walls 10p and is inserted into the head portion 30b. In this instance, the band portion 30a is guided to between the distal ends of the locking walls 10p by the groove 10n. Thereafter, the band portion 30a is fastened, locked by the head portion 30b, and fixed. When the band portion 30a is locked by the head portion 30b, the wiring material 20 is fixed to the main body 10 of the protector 1 while being supported by the support surface 10t as illustrated in FIG. 1. The wiring material 20 may be placed on the support surface 10t when the band portion 30a is inserted into the insertion hole 10h. In this case, after the wiring material 20 is placed on the support surface 10t, the band portion 30a is wound around the main body 10 and the wiring material 20.

The protector 1, the wiring material 20, and the band member 30 described above are included in a wiring structure 100 that fixes the wiring material 20 and the protector 1. In other words, the wiring structure 100 according to the embodiment includes the protector 1, the wiring material 20, and the band member 30 described above. In addition, the wire harness WH includes the protector 1, the wiring material 20, and the band member 30.

As described above, the protector 1 according to the embodiment has the support surface 10t that supports the wiring material 20 and the back surface 10r on the opposite side from the support surface 10t, and includes the main body 10 having the first wall 10a and the second wall 10b erected with respect to the first wall 10a from the first edge 10v corresponding to one edge of the first wall 10a in the width direction X. The main body 10 has the insertion hole 10h into which the band portion 30a of the band member 30 is inserted and the locking portion 10k which locks the head portion 30b. Here, the band member 30 has the band portion 30a and the head portion 30b into which the band portion 30a is inserted. The locking portion 10k corresponds to a pair of protrusions protruding from the back surface 10r. Each of the pair of protrusions has the width direction wall 10g extending in a direction intersecting the extending direction of the first wall 10a and the locking wall 10p protruding from the width direction wall 10g toward the other one of the pair of protrusions. The locking wall 10p is formed at the second edge 10w corresponding to the other edge of the first wall 10a in the width direction X, and distal ends of the locking walls 10p face each other. The interval W1 between the distal ends of the locking walls 10p is an interval that allows passage of the band portion 30a and regulates passage of the head portion 30b.

In the protector 1 according to the embodiment, the main body 10 has the width direction wall 10g and the locking wall 10p as the locking portion 10k on the back surface 10r. In the protector 1 according to the embodiment, a shift of the head portion 30b in the direction in which the first wall 10a extends can be regulated by the width direction wall 10g. Further, when the head portion 30b is about to move in the direction from the first edge 10v to the second edge 10w, the locking wall 10p may lock the head portion 30b. Therefore, it is possible to regulate movement of the head portion 30b around the main body 10 and the wiring material 20. According to such a configuration, it is possible to suppress the shift of the head portion 30b. When the shift of the head portion 30b is suppressed, it is possible to inhibit the head portion 30b or the distal end 30t of the band portion 30a from interfering with another article.

For example, a configuration in which another article is disposed on the support surface 10t side of the main body 10 (for example, above the wiring material 20) and the head portion 30b is disposed on the support surface 10t side of the main body 10 may not be desirable in some cases. In the protector 1 according to the embodiment, since the head portion 30b is locked by the locking wall 10p on the back surface 10r side, movement of the head portion 30b to the support surface 10t side of the main body 10 is regulated. Therefore, it is possible to inhibit the head portion 30b from interfering with another article disposed on the support surface 10t side of the main body 10.

In the protector 1 according to the embodiment, one insertion hole 10h into which one band member 30 is inserted is sufficient. When compared to a protector in which one band member is inserted into two insertion holes, in the protector 1 according to the embodiment, an operation of inserting the band member 30 into the insertion hole 10h is performed once, and thus it is possible to improve workability of an operation of fixing the wiring material 20 to the protector 1.

In addition, in the protector 1 according to the embodiment, the groove 10n that allows passage of the band portion 30a and guides the band portion 30a to between the distal ends of the locking walls 10p is formed on the end surface 10e of the first wall 10a on the second edge 10w side.

Since the band portion 30a is guided to between the distal ends of the locking walls 10p by the groove 10n, it is possible to improve workability of the operation of fixing the wiring material 20 to the protector 1.

In addition, in the protector 1 according to the embodiment, the width direction wall 10g extends from the locking wall 10p to the insertion hole 10h.

When the width direction wall 10g extends from the locking wall 10p to the insertion hole 10h, the band portion 30a is guided along the insertion hole 10h from the locking wall 10p on the back surface 10r side of the main body 10. Since the band portion 30a is disposed between pair of width direction walls 10g, it is possible to suppress a position shift of the band portion 30a.

The wiring structure 100 according to the embodiment includes the wiring material 20, the protector 1 which has the support surface 10t supporting the wiring material 20 and the back surface 10r on the opposite side from the support surface 10t and in which the wiring material 20 is wired along the support surface 10t, and the band member 30 which has the band portion 30a and the head portion 30b into which the band portion 30a is inserted and fixes the wiring material 20 to the protector 1. The protector 1 has the first wall 10a and the second wall 10b erected with respect to the first wall 10a from the first edge 10v which is one edge of the first wall 10a in the width direction X. The protector 1 has the insertion hole 10h into which the band portion 30a is inserted and the locking portion 10k which locks the head portion 30b. The locking portion 10k corresponds to a pair of protrusions protruding from the back surface 10r. Each of the pair of protrusions has the width direction wall 10g that extends in the direction intersecting the extending direction of the first wall 10a and the locking wall 10p protruding from the width direction wall 10g toward the other one of the pair of protrusions. The locking wall 10p is formed at the second edge 10w corresponding to the other edge of the first wall 10a in the width direction X, and the distal ends of the locking walls 10p face each other. The interval W1 between the distal ends of the locking walls 10p is an interval that allows passage of the band portion 30a and regulates passage of the head portion 30b. The band portion 30a is inserted into the insertion hole 10h, is wound around the wiring material 20 and the protector 1, passes between the distal ends of the locking walls 10p, and is inserted into the head portion 30b.

In the wiring structure 100 according to the embodiment, the protector 1 has the width direction wall 10g and the locking wall 10p as the locking portion 10k on the back surface 10r. In the wiring structure 100 according to the embodiment, the shift of the head portion 30b in the direction in which the first wall 10a extends may be regulated by the width direction wall 10g of the protector 1. In addition, when the head portion 30b is about to move in the direction from the first edge 10v to the second edge 10w, the locking wall 10p may lock the head portion 30b. Therefore, it is possible to regulate movement of the head portion 30b around the main body 10 and the wiring material 20. Therefore, according to such a configuration, it is possible to suppress the shift of the head portion 30b after fixing the wiring material 20 and the protector 1. When the shift of the head portion 30b is suppressed, the head portion 30b or the distal end 30t of the band portion 30a is inhibited from interfering with another article.

In the wiring structure 100 according to the embodiment, since the head portion 30b is locked by the locking wall 10p on the back surface 10r side of the protector 1, movement of the head portion 30b to the support surface 10t side of the protector 1 is regulated. Therefore, it is possible to inhibit the head portion 30b from interfering with another article disposed on the support surface 10t side of the protector 1.

In the wiring structure 100 according to the embodiment, one insertion hole 10h into which one band member 30 is inserted is sufficient. When compared to another wiring structure in which one band member is inserted into two insertion holes, in the wiring structure 100 according to the embodiment, an operation of inserting the band member 30 into the insertion hole 10h is performed once, and thus it is possible to improve workability of an operation of fixing the wiring material 20 to the protector 1.

In the above-described embodiment, a description has been made using an example in which the wiring material 20 is an electric wire. However, the invention is not limited to this example. For example, the wiring material 20 may correspond to a metal rod. Here, the metal rod is obtained by covering an outside of a rod-like member made of metal with an insulating coating portion. In addition, it is possible to use one electric wire or use an electric wire bundle in which three or more electric wires are bundled.

In the above description, an example in which the first wall 10a extends in the slightly curved manner in the direction orthogonal to the two directions corresponding to the direction from the back surface 10r of the first wall 10a to the support surface 10t of the first wall 10a and the width direction X has been described. However, the invention is not limited to this example. For example, the first wall 10a may extend straight along the direction orthogonal to the two directions corresponding to the direction from the back surface 10r of the first wall 10a to the support surface 10t of the first wall 10a and the width direction X.

In the above description, the description has been given using an example in which the insertion hole 10h is formed in the second wall 10b. However, the invention is not limited to this example. For example, the insertion hole 10h may be formed in the first wall 10a.

In the above description, the description has been given using an example in which the width direction wall 10g extends from the locking wall 10p to the insertion hole 10h on the back surface 10r of the main body 10. However, the invention is not limited to this example. For example, the width direction wall 10g may be discontinued in the middle between the locking wall 10p and the insertion hole 10h on the back surface 10r of the main body 10.

The wiring structure 100 according to above-described embodiment may be used for a purpose other than fixing of the wiring material 20 and the protector 1. For example, in an electrical connection box, the wiring structure of the embodiment may be used to fix a casing and a wiring material.

First Modification of Embodiment

Figure 9:
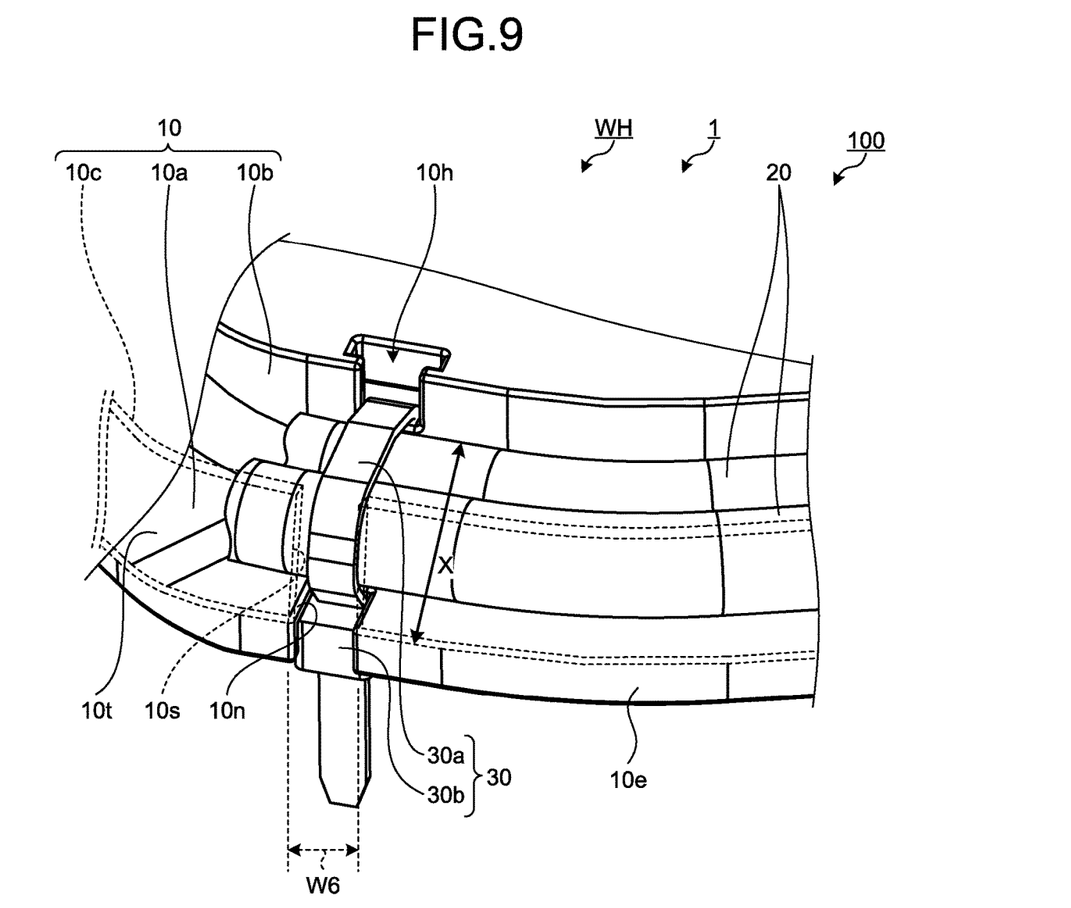
FIG. 9 is a perspective view illustrating a protector according to a first modification of the embodiment.

A first modification of the embodiment will be described with reference to FIG. 9. The present modification relates to a protector and a wiring structure. FIG. 9 is a perspective view illustrating the protector according to the first modification of the embodiment. FIG. 9 corresponds to FIG. 1 of the above-described embodiment.

For example, a protector 1 according to the present modification is different from the protector 1 according to the above-described embodiment in that a main body 10 has a third wall 10c. In addition, for example, a wiring structure 100 according to the present modification is different from the wiring structure 100 according to the above-described embodiment in that the protector 1 according to the present modification is included instead of the protector 1 according to the above-described embodiment.

The third wall 10c is erected with respect to the first wall 10a from the second edge 10w along the extending direction of the first wall 10a. A slit 10s is formed in the third wall 10c.

The slit 10s divides the third wall 10c in an extending direction of the third wall 10c. The slit 10s communicates with the groove 10n. A width W6 of the slit 10s along the extending direction of the third wall 10c is wider than the width W2 of the band portion 30a. In the present modification, the width W6 of the slit 10s is substantially the same width as the interval W1 (see FIG. 4) between the distal ends of the locking walls 10p.

In the present modification, the protector 1 has the third wall 10c. According to this configuration, it is possible to protect the wiring material 20 from an external force from the third wall 10c side. The protector 1 according to the present modification may be provided with a lid that closes a space to which the wiring material 20 is fixed surrounded by the first wall 10a, the second wall 10b, and the third wall 10c.

Second Modification of Embodiment

Figure 10:
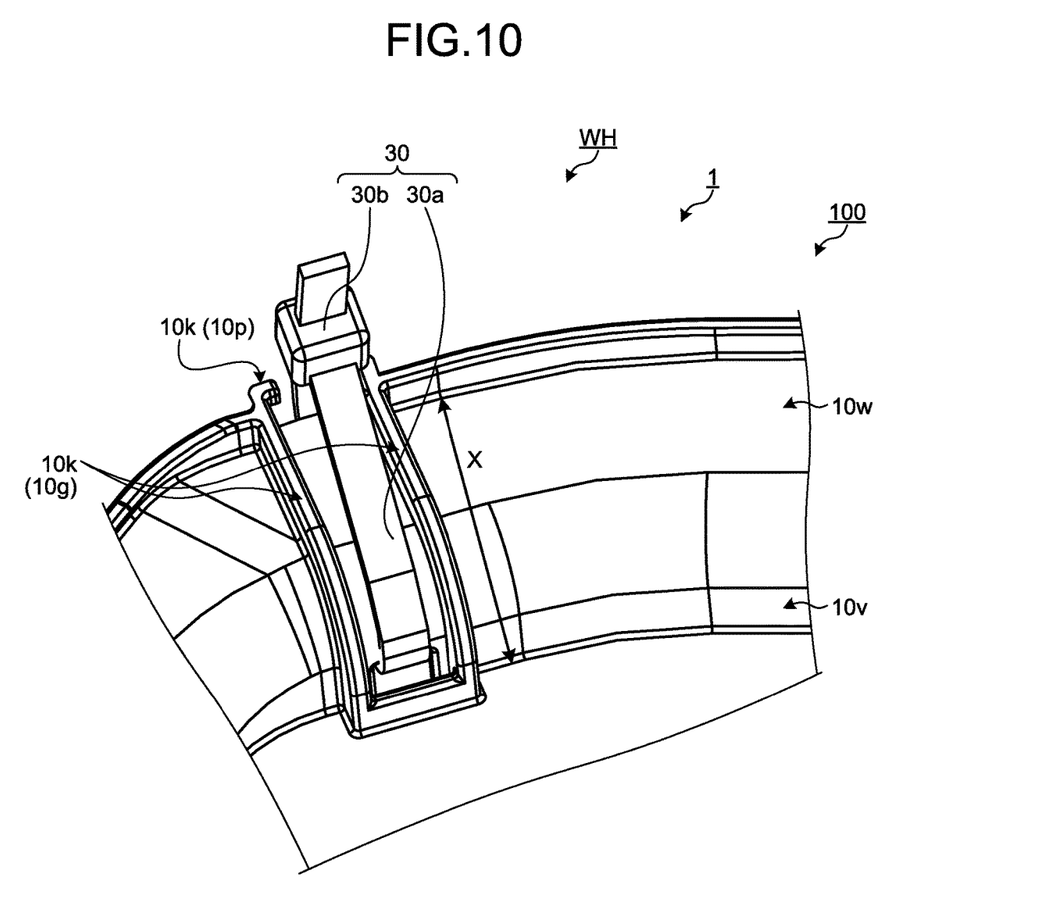
FIG. 10 is a perspective view illustrating a protector according to a second modification of the embodiment.
Figure 11:
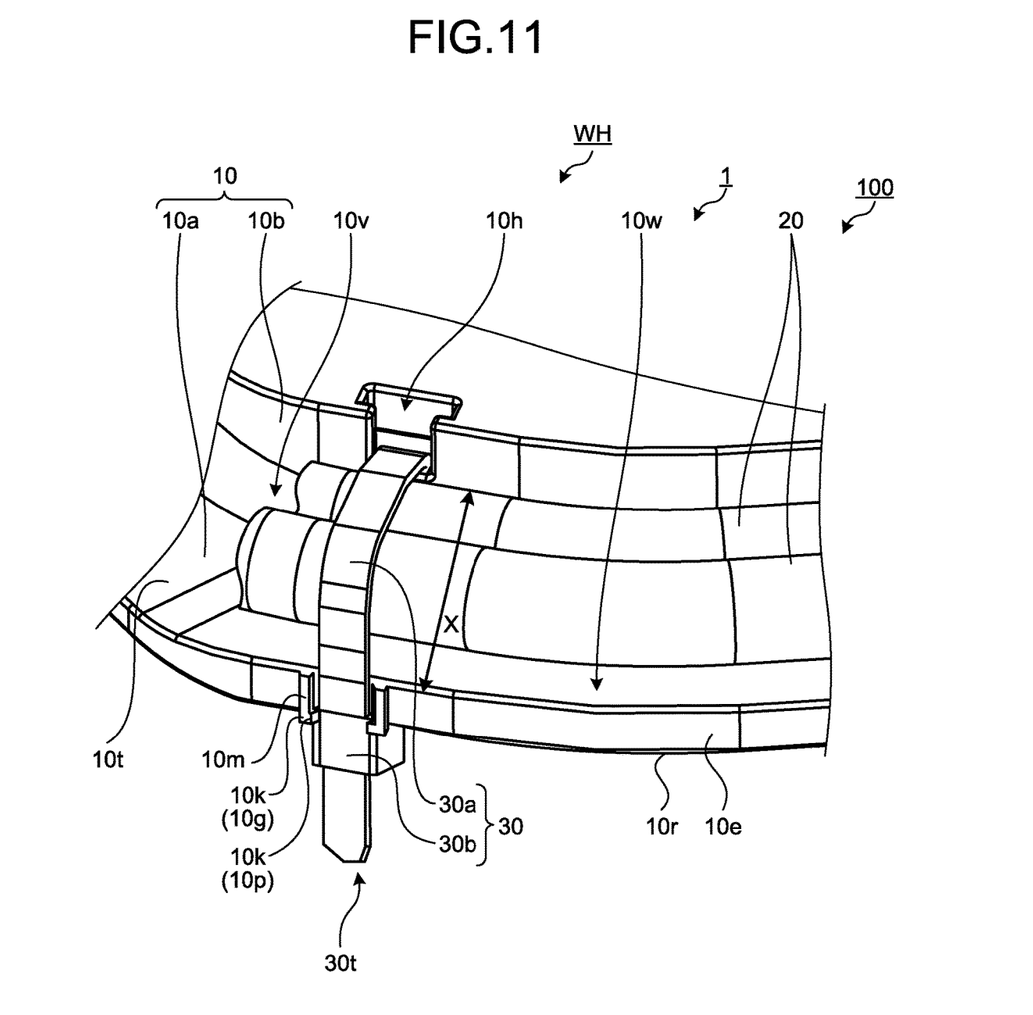
FIG. 11 is a perspective view illustrating the protector according to the second modification of the embodiment.

A second modification of the embodiment will be described with reference to FIG. 10 and FIG. 11. The present modification relates to a protector and a wiring structure. FIG. 10 is a perspective view illustrating the protector according to the second modification of the embodiment. FIG. 11 is a perspective view illustrating the protector according to the second modification of the embodiment. FIG. 10 corresponds to FIG. 8 of the above-described embodiment. FIG. 11 corresponds to FIG. 1 of the above-described embodiment.

As illustrated in FIG. 10 and FIG. 11, for example, a protector 1 according to the present modification is different from the protector 1 according to the above-described embodiment in that the groove 10n is not formed on the first wall 10a described above. In addition, as illustrated in FIG. 11, the protector 1 according to the present modification is different from the protector 1 according to the above-described embodiment in that a pair of ribs 10m is formed on the end surface 10e. The pair of ribs 10m protrudes from the end surface 10e. The ribs 10m extends along a direction from the back surface 10r to the support surface 10t. Ends of the ribs 10m on the back surface 10r side are connected to ends of the width direction wall 10g on the second edge 10w side. That is, the ribs 10m are formed continuously with the width direction walls 10g. The pair of locking walls 10p protrudes from the ends of the width direction walls 10g (ends on the second edge 10w side) connected to the ends of the ribs 10m on the back surface 10r side to the other one of the pair of protrusions. The distal ends of the locking walls 10p face each other.

In addition, for example, a wiring structure 100 according to the present modification is different from the wiring structure 100 according to the above-described embodiment in that the protector 1 according to the present modification is included instead of the protector 1 according to the above-described embodiment.

In the present modification, an interval between the pair of ribs 10m is formed to be substantially the same interval as an interval between the pair of width direction walls 10g. According to this configuration, it is possible to suppress the shift of the band portion 30a in the direction in which the first wall 10a extends without forming the notched groove 10n (see FIG. 1) as in the above embodiment. In addition, the ribs 10m may allow passage of the band portion 30a and guide the band portion 30a to between the distal ends of the locking walls 10p.

For example, it is important to selectively use the protector 1 of the above-described embodiment and the protector 1 of the present modification in consideration of workability of the operation of fixing the wiring material 20 to the protector 1, the material and strength of the protector 1, etc.

Contents disclosed in the above embodiment and each modification may be appropriately combined and executed.

A protector according to the embodiment has a locking portion that locks a head portion of a band member. The locking portion corresponds to a pair of protrusions protruding from a back surface of a main body, and each of the pair of protrusions has a width direction wall and a locking wall. According to the protector according to the invention, an interval between distal ends of locking walls is an interval that allows passage of a band portion and regulates passage of the head portion, and thus it is possible to fix a wiring material to the protector with excellent workability, and to suppress a shift of the head portion after fixing.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A protector comprising:
   a main body having a support surface that supports a
      wiring material and a back surface on an opposite side from the support surface and having a first wall and a second wall erected with respect to the first wall from a first edge that is one edge of the first wall in a width direction, wherein the main body has an insertion hole into which a band portion of a band member is inserted and a locking portion that locks a head portion, the band member having the band portion and the head portion into which the band portion is inserted, the locking portion includes a pair of protrusions protruding from the back surface, each of the pair of protrusions has a width direction wall extending in a direction intersecting an extending direction of the first wall and a locking wall protruding from the width direction wall toward the other one of the pair of protrusions, the locking wall is formed at a second edge that is the other edge of the first wall in the width direction, and distal ends of the locking walls face each other, an interval between the distal ends of the locking walls is an interval that allows passage of the band portion and regulates passage of the head portion, the width direction walls store the head portion between the width direction walls, and a groove extends along the distal ends of the locking walls, allows passage of the band portion, guides the band portion to between the distal ends of the locking walls, and is formed on an end surface of the first wall on a side of the second edge.

2. The protector according to claim 1, wherein
the groove that allows passage of the band portion and guides the band portion to between the distal ends of the locking walls is formed on the end surface of the first wall on the side of the second edge, and
a width of the groove is a width that regulates passage of the head portion.

3. The protector according to claim 2, wherein
the width direction wall extends from the locking wall to the insertion hole.

4. The protector according to claim 1, wherein
the width direction wall extends from the locking wall to the insertion hole.

5. The protector according to claim 1, wherein
the distal ends of the locking walls are spaced away from the insertion hole.

6. The protector according to claim 1, wherein
each of the width direction walls extends across the back surface in the width direction from the insertion hole to a location on the back surface that is spaced away from the insertion hole.

7. The protector according to claim 1, wherein
the head portion abuts the distal ends when the head portion extends between the width direction walls and moves toward the distal ends.

8. The protector according to claim 1, wherein
the first wall includes the support surface and the back surface, and
the second wall includes the insertion hole.

9. The protector according to claim 1, wherein
each of the pair of protrusions has the width direction wall extending across the back surface in the width direction intersecting the extending direction of the first wall.

10. A wiring structure comprising:
a wiring material;
a protector having a support surface that supports the wiring material and a back surface on an opposite side from the support surface, the wiring material being wired along the support surface; and
a band member having a band portion and a head portion into which the band portion is inserted and fixing the wiring material to the protector, wherein
the protector has a first wall and a second wall erected with respect to the first wall from a first edge that is one edge of the first wall in a width direction,
the protector has an insertion hole into which the band portion is inserted and a locking portion that locks the head portion,
the locking portion includes a pair of protrusions protruding from the back surface,
each of the pair of protrusions has a width direction wall extending in a direction intersecting an extending direction of the first wall and a locking wall protruding from the width direction wall toward the other one of the pair of protrusions,
the locking wall is formed at a second edge that is the other edge of the first wall in the width direction, and distal ends of the locking walls face each other,
an interval between the distal ends of the locking walls is an interval that allows passage of the band portion and regulates passage of the head portion,
the band portion is inserted into the insertion hole, is wound around the wiring material and the protector, passes between the distal ends of the locking wall, and is inserted into the head portion,
the width direction walls store the head portion between the width direction walls, and
a groove extends along the distal ends of the locking walls, allows passage of the band portion, guides the band portion to between the distal ends of the locking walls, and is formed on an end surface of the first wall on a side of the second edge.

* * * * *